US008090695B2

(12) United States Patent  
Consul et al.

(10) Patent No.: US 8,090,695 B2
(45) Date of Patent: Jan. 3, 2012

(54) DYNAMIC RESTORATION OF MESSAGE OBJECT SEARCH INDEXES

(75) Inventors: Ashish Consul, Redmond, WA (US); Suryanarayana M. Gorti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 12/329,395

(22) Filed: Dec. 5, 2008

(65) Prior Publication Data

US 2010/0145933 A1 Jun. 10, 2010

(51) Int. Cl.
G06F 7/00 (2006.01)
G06F 17/00 (2006.01)

(52) U.S. Cl. ............ 707/673; 707/677; 709/206

(58) Field of Classification Search .................. None
See application file for complete search history.

(56) References Cited

U.S. PATENT DOCUMENTS

| | | | |
|---|---|---|---|
| 5,987,621 A | 11/1999 | Duso | |
| 6,115,455 A * | 9/2000 | Picard | 379/67.1 |
| 6,578,025 B1 * | 6/2003 | Pollack et al. | 1/1 |
| 6,976,053 B1 | 12/2005 | Tripp | |
| 7,072,901 B2 | 7/2006 | Teraguchi | |
| 7,165,082 B1 * | 1/2007 | DeVos | 707/999.202 |
| 7,240,069 B2 | 7/2007 | Samsonov | |
| 7,424,682 B1 * | 9/2008 | Pupius et al. | 715/758 |
| 7,529,753 B1 * | 5/2009 | Ewing | 1/1 |
| 7,657,582 B1 * | 2/2010 | Cram et al. | 707/640 |
| 7,761,456 B1 * | 7/2010 | Cram et al. | 707/754 |
| 2002/0099690 A1 * | 7/2002 | Schumacher | 707/1 |
| 2002/0103867 A1 * | 8/2002 | Schilter | 709/206 |
| 2002/0120633 A1 * | 8/2002 | Stead | 707/104.1 |
| 2002/0122543 A1 * | 9/2002 | Rowen | 379/93.01 |
| 2003/0041112 A1 * | 2/2003 | Tada et al. | 709/206 |
| 2003/0135555 A1 * | 7/2003 | Birrel et al. | 709/206 |
| 2004/0064512 A1 * | 4/2004 | Arora et al. | 709/206 |
| 2004/0260679 A1 * | 12/2004 | Best et al. | 707/3 |
| 2005/0044114 A1 * | 2/2005 | Kottomtharayil et al. | 707/204 |
| 2005/0223061 A1 * | 10/2005 | Auerbach et al. | 709/206 |
| 2005/0223067 A1 * | 10/2005 | Buchheit et al. | 709/206 |
| 2005/0262203 A1 * | 11/2005 | Buchheit et al. | 709/206 |
| 2006/0031340 A1 * | 2/2006 | Mathew et al. | 709/206 |
| 2006/0059178 A1 * | 3/2006 | Baron et al. | 707/100 |
| 2006/0123087 A1 * | 6/2006 | Gibson | 709/206 |
| 2007/0016648 A1 * | 1/2007 | Higgins | 709/206 |

(Continued)

OTHER PUBLICATIONS

Content Index Administration, 4 pages, accessed Sep. 29, 2008 at http://confluence.atlassian.com/display/DOC/Content+Index+Administration.

(Continued)

*Primary Examiner* — Pierre Vital
*Assistant Examiner* — Augustine Obisesan
(74) *Attorney, Agent, or Firm* — Merchant & Gould P.C.

(57) ABSTRACT

As described herein, a high-availability server system includes at least a source server system and a target server system that dynamically restore message object search indexes. Both the source server system and the target server system store copies of a mailbox database and a search index for the mailbox database. As changes are requested to the mailbox database, events are added to event lists maintained at the source node and the target node. When the data storage system at the target server system enters an error state, the source server system sends to the target server system a set of data that the target server system can use to generate a copy of search index. The target server system may then resume applying events in the event list to the search index. In this way, it may not be necessary to completely re-index the mailbox database at the target node.

18 Claims, 5 Drawing Sheets

U.S. PATENT DOCUMENTS

| | | | |
|---|---|---|---|
| 2007/0043705 A1* | 2/2007 | Kaushik et al. | 707/3 |
| 2007/0055733 A1* | 3/2007 | Maruyama | 709/206 |
| 2007/0067399 A1* | 3/2007 | Kulkarni et al. | 709/206 |
| 2007/0168500 A1* | 7/2007 | D'Souza et al. | 709/224 |
| 2008/0095337 A1* | 4/2008 | Cai et al. | 379/88.22 |

OTHER PUBLICATIONS

Going 64-bit with Microsoft Exchange Server 2007, Note on IT, Microsoft® IT Showcase, Nov. 2006, 27 pages.

Google Solutions, © Copyright Digital Matrix Solutions 1998-2008—Design: digital Matrix Solutions, 1 page.

Legato NetWorker, Copyright © 1990-2005 EMC Corporation, 932 pages.

Photoshop Lightroom Reference Guide, © 2008 Pearson Education, Peachpit Press, Jul. 4, 2008, 3 pages.

Sun StorEdge Enterprise Backup Software 7.3, Sun Microsystems, Inc., Revision 1, Dec. 2005, 920 pages.

* cited by examiner

DYNAMIC RESTORATION OF MESSAGE OBJECT SEARCH INDEXES

BACKGROUND

People throughout the world exchange enormous numbers of email messages. Due to the sheer volume of email messages sent and received by a typical person, it quickly becomes difficult for the person to identify email messages of interest. To help people identify email messages of interest, search functionality has been built into email client applications and email server applications. The search functionality finds email messages that contain text that conforms to queries entered by users of the email client applications. For example, the search functionality may find all email messages that contain the words "annual budget."

To find email messages that contain text that conforms to queries, some email client applications generate search indexes and use the search indexes to identify email messages that contain the text. Search indexes can be implemented in many ways, including suffix trees, ordered trees, inverted indexes, citation indexes, ngram indexes, term document matrixes, and so on.

SUMMARY

This disclosure is directed to dynamically restoring message object search indexes. As described herein, a high-availability server system includes at least a source server system and a target server system. Both the source server system and the target server system store copies of a mailbox database and a search index for the mailbox database. As changes are requested to the mailbox database, events are added to event lists maintained at the source node and the target node. When the data storage system at the target server system enters an error state, the source server system sends at least a set of data that target server system can use to generate a copy of the search index. The target server system may then resume applying events in the event list to search index. In this way, it may not be necessary to completely re-index the mailbox database at the target node.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

As briefly described above, this disclosure is directed to dynamically restoring message object search indexes. This disclosure discusses the attached figures. It will be appreciated that the figures are provided for purposes of explanation only and do not represent a sole way of implementing the technologies of this disclosure.

Figure 1:
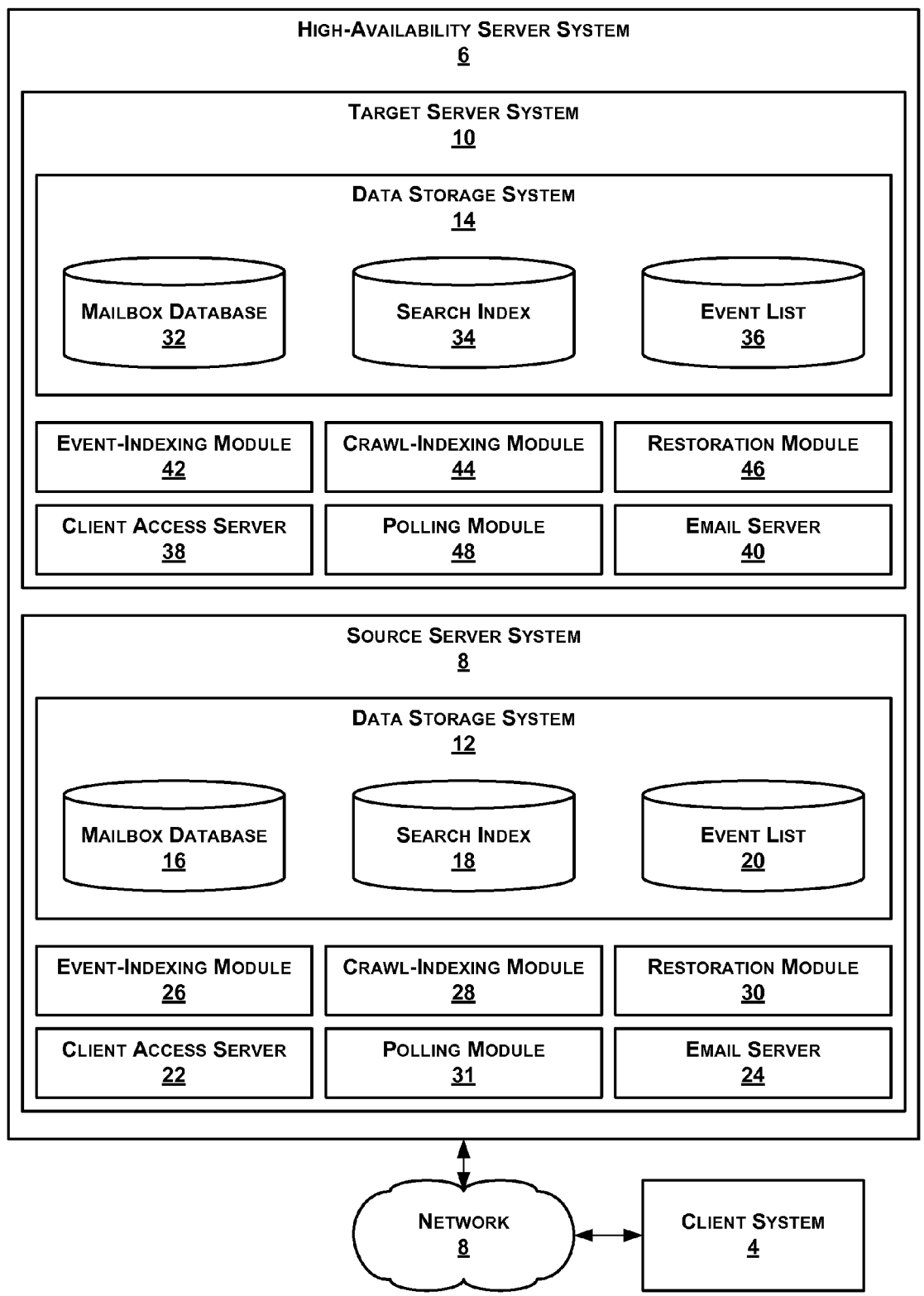
FIG. 1 is a block diagram that illustrates an example messaging system that implements the technologies of this disclosure.

FIG. 1 is a block diagram that illustrates an example messaging system 2 that implements the technologies of this disclosure. As illustrated in the example of FIG. 1, messaging system 2 comprises a client system 4. As used throughout this disclosure, a "client system" is a set of one or more physical electronic computing devices configured to utilize a network service. For example, client system 4 may be a set of one or more personal computers, laptop computers, mobile telephones, television set-top boxes, mainframe computers, standalone server devices, blade server devices, devices integrated into vehicles, handheld computing devices, personal digital assistants, media player devices, medical devices, and other types of physical computing devices configured to utilize a network service. An example electronic computing device is described below with reference to FIG. 5. Although not illustrated in the example of FIG. 1 for sake of simplicity, message system 2 may comprise many client systems like client system 4.

Furthermore, messaging system 2 comprises a high-availability server system 6 that provides messaging services. As used throughout this disclosure, a "server system" is a set of one or more physical electronic computing devices that provide at least one network service. For example, a server system may be a set of one or more standalone server devices, blade server devices, mainframe computers, network data centers, intermediate network devices, personal computers, and/or other types of physical electronic computing devices configured to provide a network service.

A "high-availability server system," such as high-availability server system 6, is a particular type of server system. A high-availability server system provides a high-availability network service and comprises at least an active server system and a standby server system. Both the active server system and the standby server system are capable of independently providing the high-availability network service. In general, the active server system provides the high-availability network service on behalf of the high-availability server system. Should the active server system enter an error state, the standby server systems becomes the new active server system and begins providing the high-availability network service on behalf of the high-availability server system with minimal disruption to the high-availability network service. A server system that provides a service is in an error state when the server system is unable to properly provide the service.

As illustrated in the example of FIG. 1, messaging system 2 includes a network 8. Network 8 is an electronic communications network that facilitates electronic communication between client system 4 and high-availability server system 6. For example, network 8 may be a wide-area network, such as the Internet, a local-area network, a metropolitan-area network, or another type of electronic communication network. Network 8 may include wired and/or wireless data links. A variety of communications protocols may be used in network 8 including, but not limited to, Ethernet, Transport Control Protocol (TCP), Internet Protocol (IP), Hypertext Transfer Protocol (HTTP), SOAP, remote procedure call protocols, and/or other types of communications protocols.

As illustrated in the example of FIG. 1, high-availability server system 6 includes a source server system 8 and a target server system 10. Although not illustrated in the example of FIG. 1 for sake of simplicity, high-availability server system 6 may include additional server systems independently capable of providing the messaging services on behalf of high-availability server system 6. Source server system 8 is capable of providing messaging services on behalf of high-availability server system 6 when source server system 8 is an active server system of high-availability server system 6 and stores a synchronized copy of a mailbox database and a synchronized copy of a search index. Likewise, target server system 10 is capable of providing messaging services on behalf of high-availability server system 6 when source server system 10 is an active server system of high-availability server system 6 and stores a synchronized copy of a mailbox database and a synchronized copy of a search index.

Source server system 8 or target server system 10 may be the active server system within high-availability server system 6. Moreover, in some instances, both source server system 8 and target server system 10 may be standby server systems within high-availability server system 6. In instances where source server system 8 is the active server system, target server system 10 may become the active server system when source server system 8 goes offline, and vice versa.

Source server system 8 comprises a data storage system 12 and target server system 10 comprises a data storage system 14. As used in this disclosure, a data storage system is a collection of at least one computer-readable data storage media. Example computer-readable data storage media include, but are not limited to, hard disk drives, tape drives, random access memory (RAM) units, flash memory units, electrically-erasable programmable read-only memory (EEPROM) units, floppy disks, optical discs, and other types of physical media capable of storing data.

Data storage system 12 comprises a mailbox database 16. As used in this disclosure, a mailbox database is a database that stores at least one mailbox. As used in this disclosure, a "mailbox" is a logical collection of messaging objects that is associated with a user. A "messaging object" is either a folder or a message object. A "folder" in a mailbox contains a subset of the messaging objects in the mailbox. A "message object" is a collection of properties of a message that provides information to a user. Message objects may come in a variety of forms. For example, the message objects in a mailbox may be email messages. In a second example, the message objects in a mailbox may be calendar messages. Other examples message objects include tasks, journal entries, contacts, and so on. Although not illustrated in the example of FIG. 1 for sake of simplicity, data storage system 12 may contain additional mailbox databases.

In addition, data storage system 12 comprises a search index 18. Search index 18 is a data structure that comprises search index entries. Each of the search index entries in search index 18 maps a textual reference to a set of one or more message objects in mailbox database 16. For example, a search index entry in search index 18 may map the textual reference string "florist" to three different message objects in a first mailbox within mailbox database 16. In this example, the search index entry may be used to identify efficiently all message objects in a particular mailbox within mailbox database 16 that include the string "florist" in their subject lines. Use of search index 18 to identify message objects in mailbox database 16 containing a particular string may be considerably quicker than individually scanning through message objects in mailbox database 16 to identify message objects containing the particular string. Search index 18 is not part of mailbox database 16. Although not illustrated in the example of FIG. 1 for sake of simplicity, data storage system 12 may contain additional search indexes corresponding to each additional mailbox database stored in data storage system 12.

Data storage system 12 also comprises an event list 20. Event list 20 is a data structure that stores events that represent changes to mailboxes in mailbox database 16. Events may contain data representing many types of changes to mailboxes. In a first example, an event may contain data representing an addition of an email message to a mailbox. In a second example, an event may contain data representing an edit by a user of a message object in a mailbox. In a third example, an event may contain data representing deletion of a message object from a mailbox. Although not illustrated in the example of FIG. 1 for sake of simplicity, data storage system 12 may contain additional event lists corresponding to each additional mailbox database stored in data storage system 12.

In addition to data storage system 12, source server system 8 comprises a client access server 22. Client access server 22 provides a mailbox access service that enables clients, such as client system 4, to access message objects stored in mailbox database 16. In instances where data storage system 12 stores additional mailbox databases, client access server 22 may provide access to the additional mailbox databases.

When source server system 8 is the active server system within high-availability server system 6, client access server 22 may provide the mailbox access service on behalf of high-availability server system 6. In other words, in some example implementations, when source server system 8 is the active server system, no client access server within high-availability server system 6 other than client access server 22 provides the mailbox access service.

Client access server 22 may update mailbox database 16 and add events to event list 20. For example, client system 4 may send to client access server 22 a request to delete a message object in a mailbox in mailbox database 16. In this example, client access server 22 deletes the message object from the mailbox and adds an event to event list 20 representing deletion of the message object from the mailbox.

In the example of FIG. 1, source server system 8 also comprises an email server 24. Email server 24 provides a service that receives email messages. When email server 24 receives an email message associated with a mailbox in mailbox database 16, email server 24 adds the email message to the mailbox and adds an event to event list 20 representing addition of the email message to the mailbox.

Mailboxes in mailbox database 16 may be in an event indexing mode or a crawl indexing mode. When a mailbox in mailbox database 16 is in crawl indexing mode, all message objects in the mailbox have not yet been indexed and search index 18 is being updated so that message objects in the mailbox are searchable using search index 18. When a mailbox in mailbox database 16 is in event indexing mode, all message objects in the mailbox have been previously indexed and search index 18 is updated only in response to events in event list 20. In this disclosure, mailbox in the event indexing mode may be referred to as event-mode mailboxes and mailboxes in the crawl indexing mode may be referred to as crawl-mode mailboxes.

Source server system 8 also comprises an event-indexing module 26. Event-indexing module 26 performs an event-indexing process that processes events stored in event list 20. As event-indexing module 26 processes events, event-indexing module 26 updates search index 18 based on the events that represent changes to event-mode mailboxes in mailbox database 16. For example, event list 20 may contain an event representing an addition of a message object to an event-mode mailbox in mailbox database 16. In this example, event module 20 may process the event by updating one or more entries in search index 18 so that the new message object is searchable using search index 18.

To track which events in event list 20 have been processed and which events in event list 20 have not yet been processed, event-indexing module 26 maintains a watermark that identifies a event in event list 20 that event-indexing module 26 has most-recently processed. In one example implementation, event-indexing module 26 processes an event that sequentially (e.g., chronologically) follows the event indicated by the watermark and then advances the watermark.

Event-indexing module 26 does not remove events from event list 20 after event-indexing module 26 processes the events. Rather, in one example implementation, a separate module (not shown in the example of FIG. 1) automatically removes events from event list 20 after the events have been on event list 20 for a given period of time (e.g., thirty days). An example event-indexing process performed by event-indexing module 26 is described below with reference to FIG. 2.

Source server system 8 also comprises a crawl-indexing module 28. Crawl-indexing module 28 performs a crawl-indexing process that updates search index 18 based on un-indexed message objects stored in crawl-mode mailboxes in the mailbox database. An example crawl-indexing process performed by crawl-indexing module 28 is described below with reference to FIG. 3.

In addition, source server system 8 comprises a restoration module 30. As explained below, restoration module 30 uses the content of data storage system 12 to restore the content of data storage system 14 in target server system 10. An example operation performed by restoration module 30 to restore content of data storage system 14 is described below with reference to FIG. 4.

Source server system 8 also comprises a polling module 31. When source server system 8 is a standby server system in high-availability server system 6, polling module 31 polls the active server system in high-availability server system 6 for new events generated in the event list of the active server system. When polling module 31 receives a new event, polling module 31 adds the new event to event list 20 and applies the new event to mailbox database 16. Consequently, when source server system 8 is a standby server system, polling module 31 keeps mailbox database 32 synchronized with the mailbox database at the active server system and keeps event list 20 synchronized with the event list in the active server system.

Event-indexing module 26, crawl-indexing module 28, restoration module 30, and polling module 31 may be implemented in a variety of ways. For example, event-indexing module 26, crawl-indexing module 28, restoration module 30, and/or polling module 31 may be implemented as software instructions that, when executed by a processing unit of source server system 8, cause source server system 8 to perform particular actions. In another example, event-indexing module 26, crawl-indexing module 28, restoration module 30, and/or polling module 31 may be implemented as application specific integrated circuits (ASICs) that perform particular actions. In yet another example, event-indexing module 26, crawl-indexing module 28, restoration module 30, and/or polling module 31 may be implemented partly as ASICs and partly as instructions that, when executed by the processing unit of source server system 8, cause source server system 8 to perform particular actions.

Data storage system 14 in target server system 10 stores a mailbox database 32, a search index 34, and an event list 36. Mailbox database 32, search index 34, and event list 36 have the same functionality as mailbox database 16, search index 18, and event list 20 in data storage system 12 in source server system 8. Furthermore, target server system 10 comprises a client access server 38, an email server 40, an event-indexing module 42, a crawl-indexing module 44, a restoration module 46, and a polling module 48. Client access server 38, email server 40, event-indexing module 42, crawl-indexing module 44, restoration module 46, and polling module 48 have the same functionality as client access server 22, email server 24, event-indexing module 26, crawl-indexing module 28, restoration module 30, and polling module 31 in source server system 8.

Data storage system 12 or data storage system 14 may enter an error state. A data storage system is in an error state when the data storage system is unable to properly respond to read and write requests. For example, a data storage system may be in an error state when it is completely broken. In another example, a data storage system may be in an error state when it contains corrupted data. Data storage system 12 or data storage system 14 may enter an error state for a wide variety of reasons. For example, data storage system 12 or data storage system 14 may enter an error state due to physical damage, age, corruption of mailbox data, corruption of the search indexes, corruption of other types of data, loss of ability to write data, loss of ability to retrieve data, and due to other causes. When data storage system 12 or data storage system 14 enters an error state, source server system 8 or target server system 10 are taken offline and remedial actions are taken to provide data storage capability to source server system 8 or target server system 10. Example remedial actions may include replacing, reformatting, reconnecting, and other actions to provide data storage capability.

Assume, for purposes of explanation, that data storage system 14 has entered an error state and remedial action has been taken to provide data storage capability to target server system 10. After the administrator takes the remedial actions, the administrator brings target server system 10 back online. When target server system 10 is brought back online, event-indexing module 42 does not initially begin performing an event-indexing process, crawl-indexing module 44 does not initially begin performing an crawl-indexing process, and polling module 48 does not initially begin polling the active server system for new events. In addition, when the administrator brings target server system 10 back online, data in data storage system 14 may be not synchronized with data in data storage system 12.

To resynchronize data in data storage system 14 with data in data storage system 12, restoration module 30 in source server system 8 suspends the event-indexing process of event-indexing module 26 and the crawl-indexing process of crawl-indexing module 28. Restoration module 30 may then transfer a set of data that target server system 10 can use to generate a copy of mailbox database 16 at mailbox database 32. In addition, restoration module 30 may transfer a set of data that target server system 10 can use to generate a copy of search index 18 at search index 34. Restoration module 30 may also transfer a set of data that target server system 10 can use to generate a copy of event list 20 at event list 36. In addition, restoration module 30 transfers to event-indexing module 42 the watermark used by event-indexing module 26. In this way, data in data storage system 14 is resynchronized with the data in data storage system 12. After restoration module 30 performs these transfers, restoration module 30 instructs event-indexing module 26 to resume the event-indexing process using events in event list 20, starting with the event indicated by the watermark. In addition, restoration module 30 instructs crawl-indexing module 28 to resume the crawl-indexing process on mailbox database 16. Furthermore, restoration module 30 instructs event-indexing module 42 to start performing the event-indexing process on mailbox database 32 using events in event list 36, starting with an event indicated by the watermark used by event-indexing module 26. Restoration module 26 also instructs crawl-indexing module 44 to start performing the crawl-indexing process on mailbox database 32. In this way, search index 34 may be restored without completely re-indexing mailbox database 32 after mailbox database 32 is resynchronized with mailbox database 16.

Figure 2:
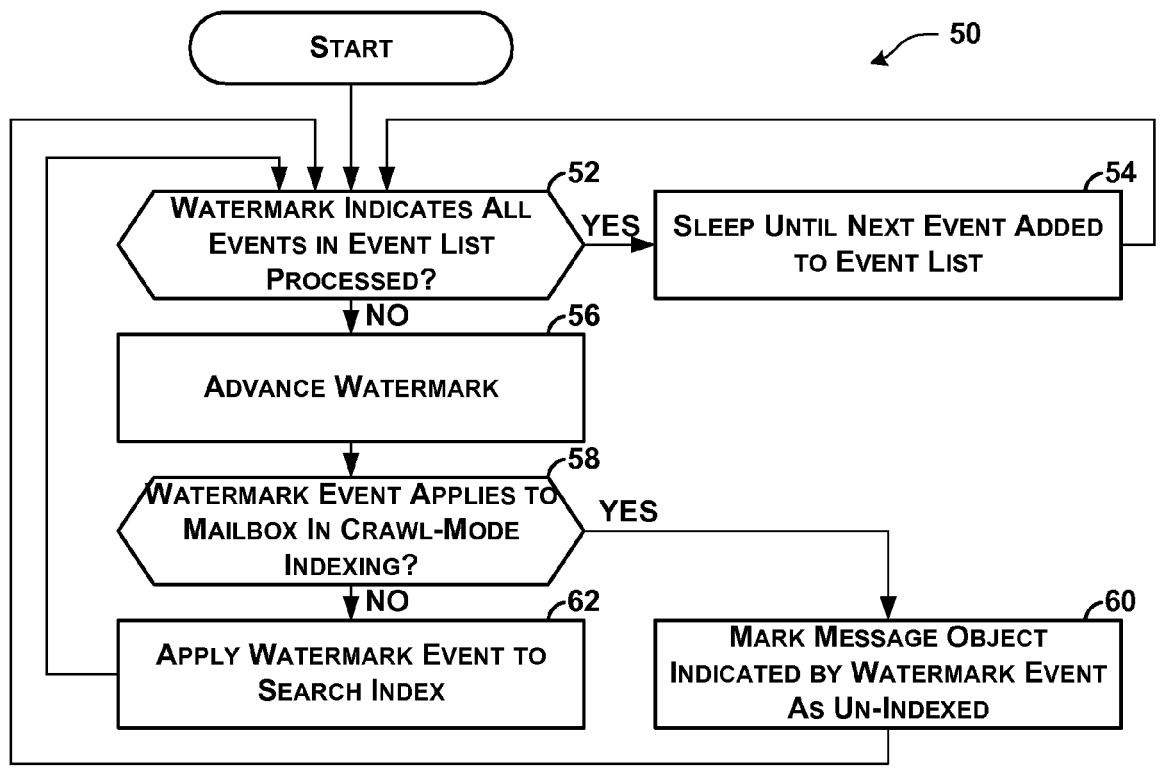
FIG. 2 is a flowchart illustrating an example event-indexing process of an event-indexing module in a source server system of the high-availability server system.

FIG. 2 is a flowchart illustrating an example event-indexing process 50 of event-indexing module 26 in source server system 8. It is to be understood that event-indexing process 50 is provided for purposes of explanation only and is not to be construed as a sole possible event-indexing process performed by event-indexing module 26 or a sole possible event-indexing process to process events in source server system 8. It is also to be understood that event-indexing process 50 may be performed by event-indexing module 42 in target server system 10 or other event-indexing modules in other server systems of high-availability server system 6.

In the example of FIG. 2, event-indexing module 26 begins event-indexing process 50 by determining whether the watermark indicates that all events in event list 20 have been processed (52).

If event-indexing module 26 determines that the watermark indicates that all events in event list 20 have been processed ("YES" of 52), event-indexing module 26 sleeps unit a next event is added to event list 20 (54). When a mailbox event is added to event list 20, event-indexing module 26 loops back and again determines whether the watermark indicates all events in event list 20 have been processed (52).

On the other hand, if event-indexing module 26 determines that the watermark indicates that one or more events in event list 20 have not been processed ("NO" of 52), event-indexing module 26 advances the watermark (56). In other words, event-indexing module 26 causes the watermark to indicate a next sequential event in event list 20 after the current watermark event. As used in this disclosure, the phrase "watermark event" refers to the event indicated by the watermark. After advancing the watermark, event-indexing module 26 determines whether the watermark event applies to a mailbox in mailbox database 16 that is in crawl-mode indexing (58). If the mailbox is in crawl-mode indexing ("YES" of 58), event-indexing module 26 marks the message object indicated by the watermark event as un-indexed (60). By marking the message object indicated by the watermark event as un-indexed, crawl-indexing module 28 will index the message object indicated by the watermark event during crawl-mode indexing of the mailbox. After marking the message object indicated by the watermark event as un-indexed, event-indexing module 26 loops back and again determines whether the watermark indicates that all events in event list 20 have been applied to search index 18 (52).

On the other hand, if the mailbox is not in crawl-mode indexing ("NO" of 58), event-indexing module 26 applies the watermark event to search index 18 (62). To apply the watermark event to search index 18, event-indexing module 26 may, in one example implementation, tokenize the message object indicated by the watermark event. Event-indexing module 26 may then, for each of the tokens, identify or generate a search index entry in search index 18 that specifies the token. After identifying or generating this search index entry, search index 18 may add an identifier of the message object indicated by the watermark event to the search index entry. The search index entries may be arranged within search index 18 as an inverted index. In addition, the message object indicated by the watermark event may have been previously indexed. For this reason, when event-indexing module 26 applies the watermark event to search index 18, event-indexing module 26 may ensure that no search index entry incorrectly identifies the selected message object. After event-indexing module 26 applies the watermark event to search index 18, event-indexing module 26 loops back and again determines whether the watermark indicates that all events in event list 20 have been applied to mailbox database 16 (52).

Figure 3:
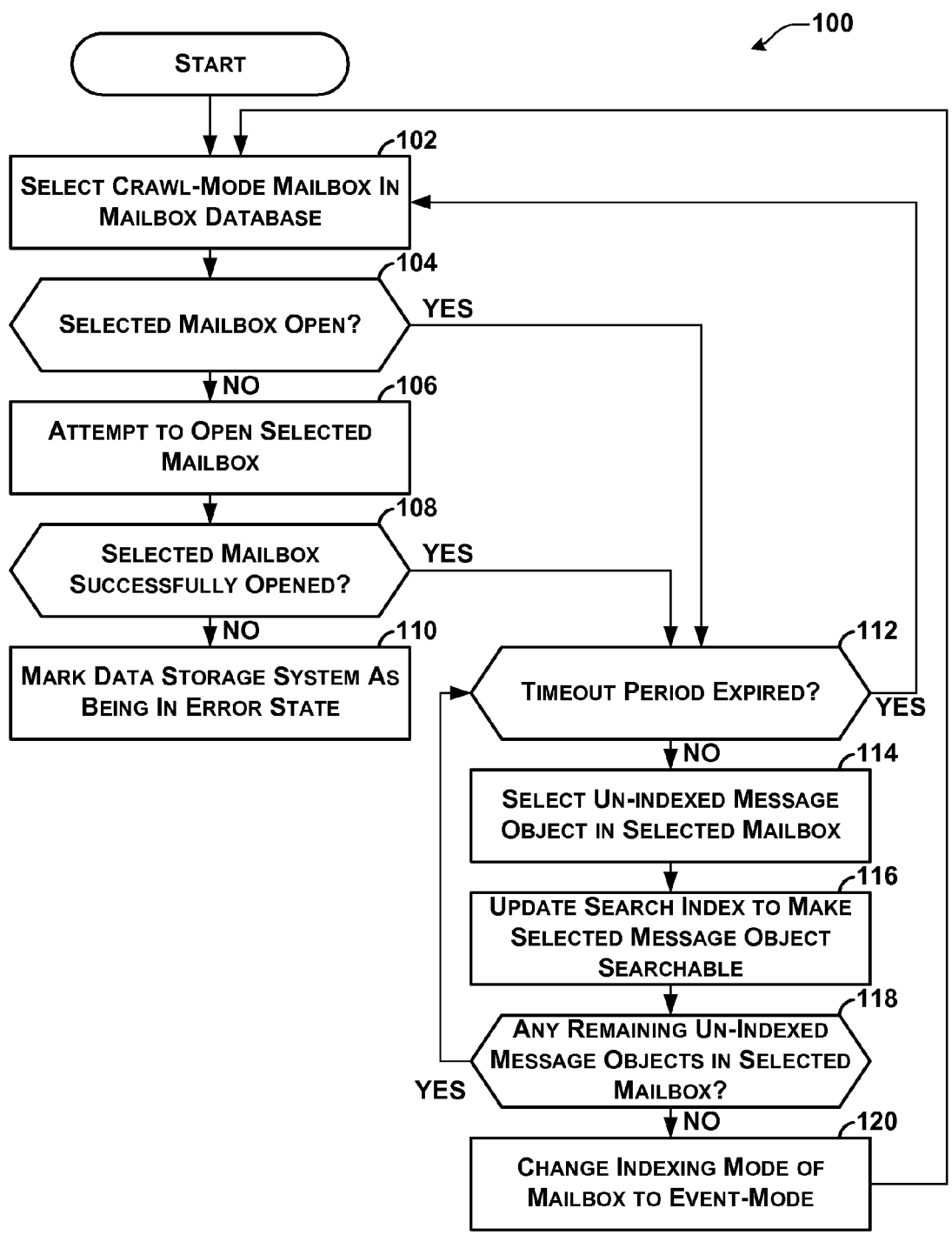
FIG. 3 is a flowchart illustrating an example crawl-indexing process of a crawl-indexing module in the source server system of the high-availability server system.

FIG. 3 is a flowchart illustrating an example crawl-indexing process 100 of crawl-indexing module 28 in source server system 8 of messaging system 2. It is to be understood that crawl-indexing process 100 is provided for purposes of explanation only and is not to be construed as a sole possible crawl-indexing process performed by crawl-indexing module 28 or a sole possible crawl-indexing process in source server system 8. It is also to be understood that crawl-indexing process 100 may be performed by crawl-indexing module 44 in target server system 10 or other crawl-indexing modules in other server systems of high-availability server system 6.

In the example of FIG. 3, crawl-indexing process 100 starts when crawl-indexing module 28 selects a crawl-mode mailbox in mailbox database 16 (102). Crawl-indexing module 28 may select the mailbox on a pseudorandom or a deterministic basis. After selecting the mailbox, crawl-indexing module 28 determines whether the selected mailbox is currently open (104). A mailbox is open when the mailbox is available to be read by crawl-indexing module 28. If the selected mailbox is not open ("NO" of 104), crawl-indexing module 28 attempts to open the selected mailbox (106). After attempting to open the selected mailbox, crawl-indexing module 28 determines whether the selected mailbox was successfully opened (108). If the mailbox was not successfully opened ("NO" of 108), crawl-indexing module 28 may mark data storage system 12 as being in an error state (110). When data storage system 12 has entered an error state, an alert may be sent to an administrator.

If, however, either the selected mailbox is already open ("YES" of 104) or the selected mailbox was successfully opened ("YES" of 108), crawl-indexing module 28 determines whether a timeout period has expired (112). The timeout period may serve to ensure that crawl-indexing module 28 does not spend all of its time indexing a particular mailbox to the exclusion of all other mailboxes in mailbox database 16.

If the timeout period has not expired ("NO" of 112), crawl-indexing module 28 selects an un-indexed message object in the selected mailbox (114). A message object may be un-indexed when the message object has never been indexed before or it has been marked as un-indexed. Crawl-indexing module 28 may select the un-indexed message object on a pseudorandom or a deterministic basis. After selecting the un-indexed message object, crawl-indexing module 28 updates search index 18 to make the selected message object searchable using search index 18 (116). When crawl-indexing module 28 updates search index 18, crawl-indexing module 28 may generate or change one or more search index entries in search index 18.

After updating search index 18 the selected message object, crawl-indexing module 28 determines whether there are any remaining un-indexed message objects in the selected mailbox (118). If there are one or more remaining un-indexed message objects in the selected mailbox ("YES" of 118), crawl-indexing module 28 loops back and again determines whether the timeout period has expired (112). If there are no remaining un-indexed message objects in the selected mailbox ("NO" of 118), crawl-indexing module 28 changes the indexing mode of the selected mailbox to notification mode (120). After changing the indexing module of the selected mailbox to notification mode, crawl-indexing module 28 loops back and again selects one of the crawl-mode mailboxes in mailbox database 16 (102).

Figure 4:
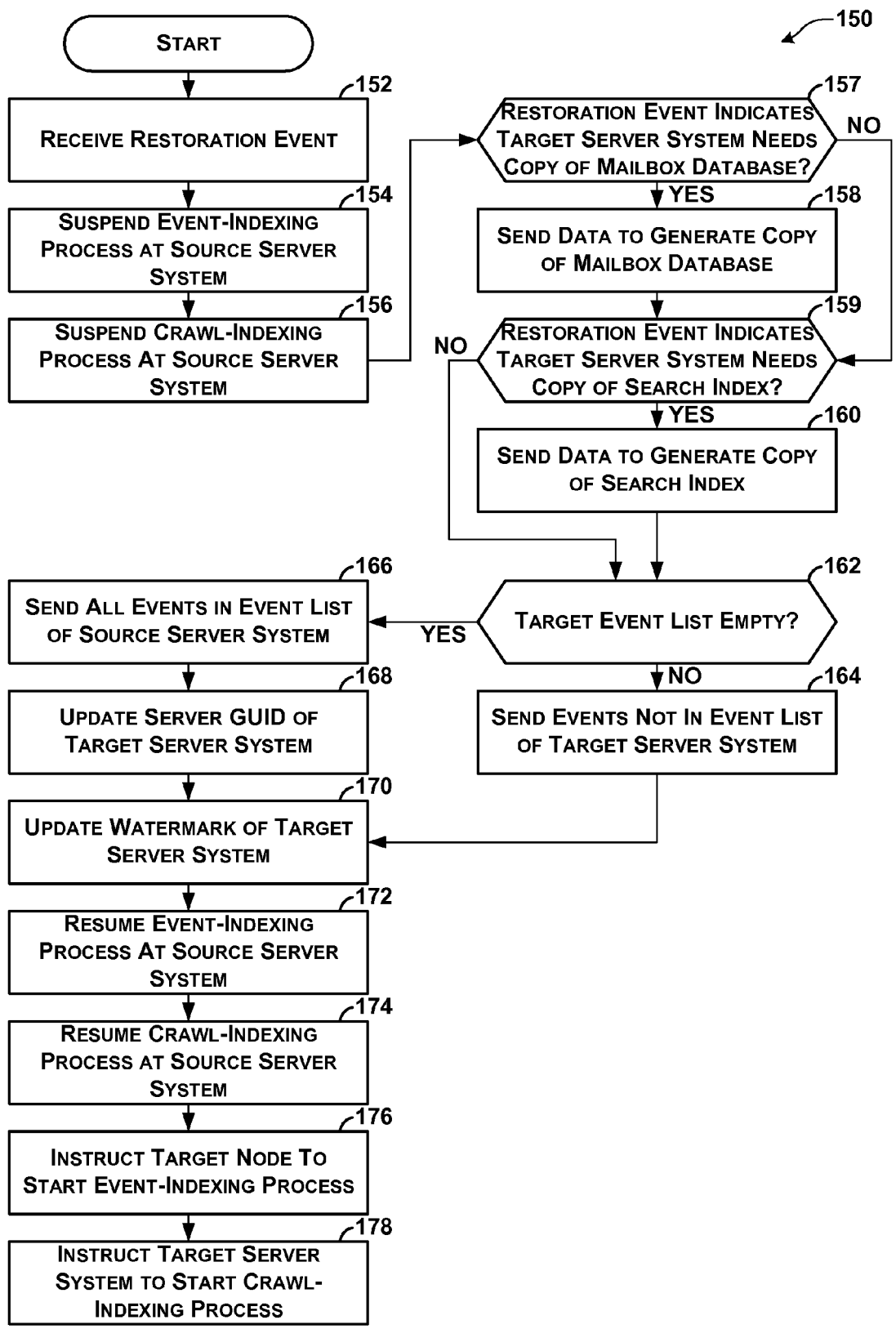
FIG. 4 is a flowchart illustrating an example operation of a restoration module in the source server system of the high-availability server system.

FIG. 4 is a flowchart illustrating an example operation 150 of restoration module 30 in source server system 8 of messaging system 2. It is to be understood that operation 150 is provided for purposes of explanation only and is not to be construed as a sole possible operation performed by restoration module 30 or a sole possible operation to restore data in source server system 8. It is also to be understood that operation 150 may be performed by restoration module 46 in target server system 10 or other event modules in other server systems of high-availability server system 6.

In the example of FIG. 4, restoration module 30 has configured source server system 8 to listen for a restoration event. Operation 150 starts when restoration module 30 receives a restoration event (152). Restoration module 30 may receive a restoration event in a variety of different circumstances. For example, restoration module 30 may receive a restoration event when an administrator of high-availability server system 6 instructs restoration module 30 to initiate operation 150. In another example, restoration module 30 may receive a restoration event when it is automatically detected that target server system 10 is coming back online. The restoration event may indicate whether target server system 10 needs a copy of mailbox database 16 and may indicate whether target server system 10 needs a copy of search index 18. In the example of FIG. 4, if target server system 10 does not need a copy of mailbox database 16 or a copy of search index 18, restoration module 30 does not send to target server system 10 data used to generate the copy of mailbox database 16 or the copy of search index 18.

In circumstances where high-availability server system 6 includes more than one server systems that have up-to-date mailbox databases and event lists, it may be most efficient for a server system to receive the restoration event when a copy of the mailbox database at the server system is mounted and all mailboxes in the copy of the mailbox database are in event-mode indexing. If there is no such server system in high-availability server system 6, it may be most efficient to send the restoration event to a server system in high-availability server system 6 that has a copy of the mailbox database at which all of the mailboxes in the copy of the mailbox database are in event-mode indexing, but at which event-mode indexing has been suspended. It is also possible, but less efficient, to send the restoration event to a server system in high-availability server system 6 at which a copy of the mailbox data includes one or more mailboxes in crawl-mode indexing.

After receiving the restoration event, restoration module 30 instructs event-indexing module 26 to suspend applying events in event list 20 to search index 18 (154). Because event-indexing module 26 is not applying events in event list 20 to search index 18 during a restoration operation, event-indexing module 26 does not change search index 18 during the restoration operation. Furthermore, restoration module 30 instructs crawl-indexing module 28 to suspend performing the crawl-indexing process on mailbox database 16 (156). Because crawl-indexing module 28 is not indexing message objects in mailbox database 16 during the restoration operation, crawl-indexing module 28 does not change search index 18 during the restoration operation.

After the event-indexing process and the crawl-index process have been suspended, restoration module 30 determines whether the restoration event indicates that target server system 10 needs a copy of mailbox database 16 (157). If restoration module 30 determines that the restoration event indicates that target server system 10 needs a copy of mailbox database 16 ("YES" of 157), restoration module 30 sends to target server system 10 a set of data that target server system 10 uses to generate a copy of mailbox database 16 at data storage system 14 (i.e., mailbox database 34) (158). In one example, restoration module 30 may send to target server system 10 a compressed version of mailbox database 16. In another example, if some of mailbox database 32 is present when target server system 10 is brought back online, restoration module 30 may send to target server system 10 only those portions of mailbox database 16 that are not already in mailbox database 32.

When restoration module 30 has sent the set of data that target server system 10 uses to generate the copy of the mailbox database 16 or when restoration module 30 determines that the restoration event indicates that target server system 10 does not need a copy of mailbox database 16 ("NO" of 157), restoration module 30 determines whether the restoration event indicates that target server system 10 needs a copy of search index 18 (159). If restoration module 30 determines that restoration event indicates that target server system 10 needs a copy of search index 18 ("YES" of 159), restoration module 30 sends to target server system 10 a set of data that target server system 10 uses to generate a copy of search index 18 at data storage system 14 (i.e., search index 36) (160). For instance, restoration module 30 may send to target server system 10 a complete copy of search index 18.

After sending the data that target server system 10 uses to restore search index 34 or after determining that the restoration event indicates that the target server system 10 does not need a copy of search index 18 ("NO" of 159), restoration module 30 determines whether event list 36 in target server system 10 is empty (162). For example, target server system 10 may have been operating normally prior to going offline. When target server system 10 went offline, event list 36 in target server system 10 may not have been completely lost. In this example, event list 36 is not empty. On the other hand, if target server system 10 has not been part of high-availability server system 6 previously, event list 36 may be empty.

If event list 36 is not empty ("NO" of 162), restoration module 30 sends to target server system 10 events in event list 20 that are not present in event list 36 of target server system 10 (164). For example, when target server system 10 went offline, event list 36 in target server system 10 may not have been completely lost. In this example, it is only necessary for restoration module 30 to transfer to target server system 10 those events that are not in event list 36.

On the other hand, if event list 36 is empty ("YES" of 162), restoration module 30 sends to target server system 10 each event in event list 20 (166). In addition, restoration module 30 sets the server globally unique identifier (GUID) of target server system 10 (168). Setting the server GUID of target server system 10 may ensure that target server system 10 is differentiable from source server system 8.

After restoration module 30 has sent to target server system 10 events in event list 20 that are not present in event list 36 or after restoration module 30 sets the server GUID, restoration module 30 updates the watermark of event-indexing module 42 such that the watermark of event-indexing module 42 indicates the same event as the watermark of event-indexing module 26 (170).

Restoration module 30 then instructs event-indexing module 26 to resume the event-indexing process (172). Next, restoration module 30 instructs crawling-indexing module 28 to resume the crawl-indexing process (174). Restoration module 30 then instructs event-indexing module 42 to begin performing the event-indexing process on mailbox database 32, starting from the event indicated by the watermark of event-indexing module 42 (176). In addition, restoration module 30 instructs crawl-indexing module 44 to begin performing the crawl-indexing process on mailbox database 32 (178). In this way, target server system 10 may begin using search index 34 to process search queries immediately after operation 150 is complete. In other words, there is no need for crawl-indexing module 44 to completely re-index mailbox database 32 after mailbox database 32 is copied from source server system 8.

Figure 5:
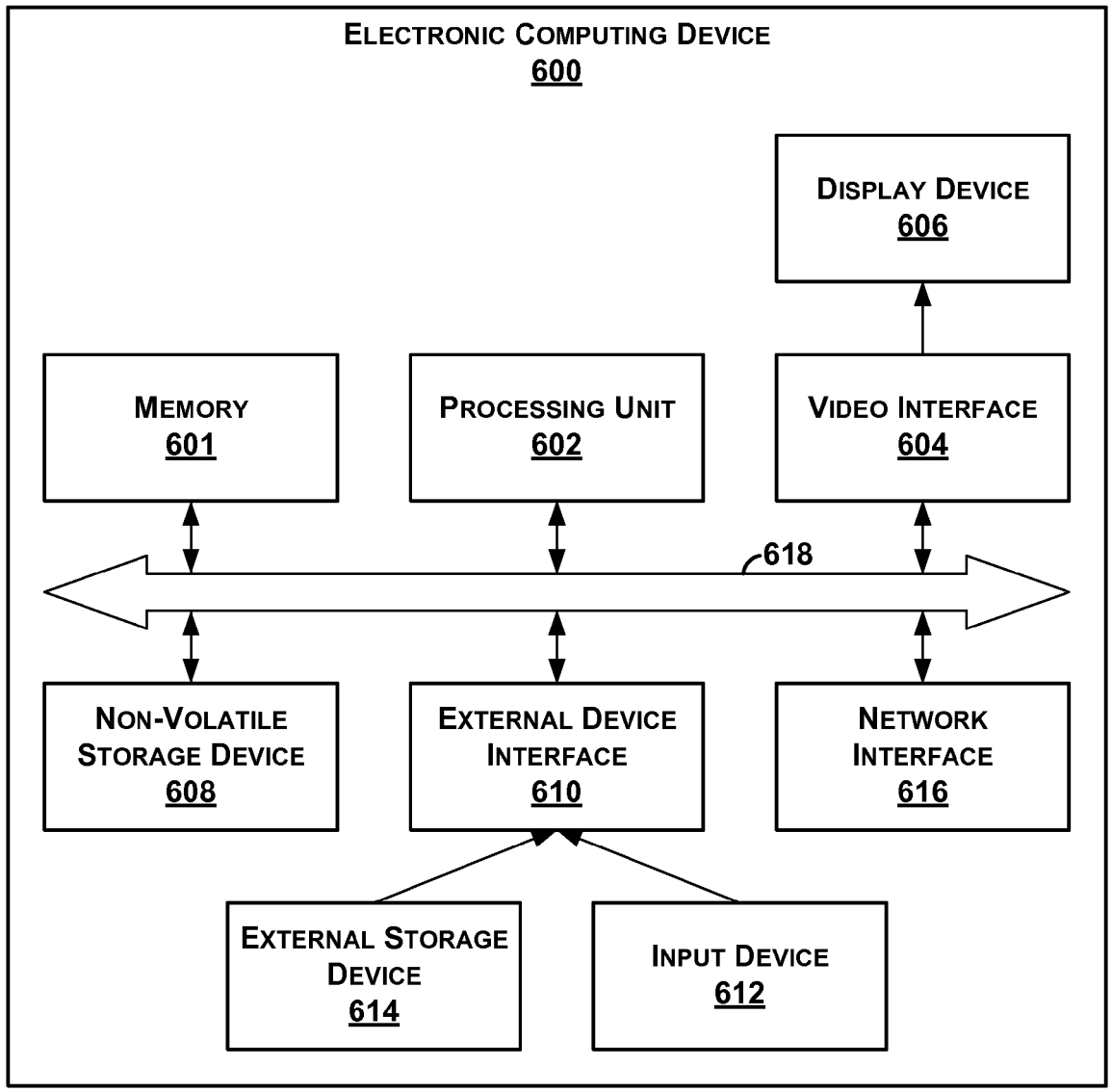
FIG. 5 is a block diagram illustrating example physical components of a physical electronic computing device.

FIG. 5 is a block diagram illustrating example physical components of electronic computing device 600. As illustrated in the example of FIG. 5, electronic computing device 600 comprises a memory unit 600. Memory unit 600 is a computer-readable storage medium that is capable of storing data and instructions. Memory unit 600 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 600 comprises a processing unit 602. In a first example, processing unit 602 may execute software instructions that cause processing unit to provide specific functionality. In this first example, processing unit 602 may be implemented as one or more processing cores and/or as one or more separate microprocessors. For instance, in this first example, processing unit 602 may be implemented as one or more Intel Core 2 microprocessors. Processing unit 602 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 602 may be implemented as an application specific integrated circuit (ASIC) that provides specific functionality. In an third example, processing unit 602 may provide specific functionality by using an ASIC and by executing software instructions.

Electronic computing device 600 also comprises a video interface 604 that enables electronic computing device 600 to output video information to a display device 606. Display device 606 may be a variety of different types of display devices. For instance, display device 606 may be a cathode-ray tube display, an LCD display panel, a plasma screen display panel, a touch-sensitive display panel, a LED array, or another type of display device.

In addition, electronic computing device 600 includes a non-volatile storage device 608. Non-volatile storage device 608 is a computer-readable storage medium that is capable of storing data and/or instructions. Non-volatile storage device 608 may be a variety of different types of different non-volatile storage devices. For example, non-volatile storage device 608 may be one or more hard disk drives, magnetic tape drives, CD-ROM drives, DVD-ROM drives, Blu-Ray disc drives, or other types of non-volatile storage devices.

Electronic computing device 600 also includes an external component interface 610 that enables electronic computing device 600 to communicate with external components. As illustrated in the example of FIG. 5, external component interface 610 communicates with an input device 612 and an external storage device 614. In one implementation of electronic computing device 600, external component interface 610 is a Universal Serial Bus (USB) interface. In other implementations of electronic computing device 600, electronic computing device 600 may include another type of interface that enables electronic computing device 600 to communicate with input device and/or output devices. For instance, electronic computing device 600 may include a PS/2 interface. Input device 612 may be a variety of different types of devices including, but not limited to keyboards, mice, trackballs, stylus input devices, touch pads, touch-sensitive display screens, or other types of input devices. External storage device 614 may be a variety of different types of computer-readable storage media including magnetic tape, flash memory modules, magnetic disk drives, optical disc drives, and other computer-readable storage media.

In addition, electronic computing device 600 includes a network interface 616 that enables electronic computing device 600 to send data to and receive data from network 18. Network interface 616 may be a variety of different types of network interface. For example, network interface 616 may be an Ethernet interface, a token-ring network interface, a fiber optic network interface, a wireless network interface (e.g., WiFi, WiMax, etc.), or another type of network interface.

Electronic computing device 600 also includes a communications medium 618 that facilitates communication among the various components of electronic computing device 600. Communications medium 618 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable storage media are illustrated in the example of FIG. 5 (i.e., memory 600, non-volatile storage device 608, and external storage device 614). Together, these computer-readable storage media may constitute a single logical computer-readable storage medium. This single logical computer-readable storage medium may store instructions executable by processing unit 602. Actions described in the above description may result from the execution of the instructions stored on this single logical computer-readable storage medium. Thus, when this description says that a particular logical module performs a particular action, such a statement may be interpreted to mean that instructions of the software module cause a processing unit, such as processing unit 602, to perform the action.

The technologies of this disclosure may be realized in many ways. For example, the technologies of this disclosure may be realized as a method for restoring a search index of a mailbox database. The method comprising automatically performing, at a source server system in a high-availability server system, a first event-indexing process that processes events stored in an event list, thereby updating a search index of a mailbox database based on ones of the events stored in the event list that represent changes to an event-mode mailbox in the mailbox database. In addition, the method comprises in response to a restoration event, automatically suspending, at the source server system, the first event-indexing process. Furthermore, the method comprises, after suspending the first event-indexing process, automatically sending, from the source server system to a target server system in the high-availability server system, a first set of data that the target server system uses to generate a copy of the search index at the target server system. The method also comprises after suspending the first event-indexing process, automatically sending a watermark from the source server system to the target server system, the watermark indicating a mailbox event in the event list that the first event-indexing process has most recently processed. In addition, the method comprises, after sending the first set of data and the watermark, automatically resuming, at the source server system, the first event-indexing process and the first crawl-indexing process. Furthermore, the method comprises after sending the first set of data and the watermark, automatically instructing, at the source server system, the target server system to begin performing a second event-indexing process that processes events stored in a copy of the event list at the target server system, thereby updating the copy of the search index based on ones of the events stored in the copy of the event list that represent changes to an event-mode mailbox in a copy of the mailbox database at the target server system, starting with a event in the copy of the event list that follows the watermark.

In another example, the technologies of this disclosure may be realized as a high-availability server system comprising a target server system that provides a service that enables clients of the high-availability server system to access message objects when the target server system is an active server system of the high-availability server system and when the target server system stores a synchronized copy of a mailbox database and a synchronized copy of a search index. In addition, the high-availability server system comprises a source server system that enables clients of the high-availability server system to access message objects when the source server system is an active server system of the high-availability server system. The source server system comprises a processing unit and a computer-readable data storage system. The computer-readable data storage system stores a mailbox database comprising message objects, a search index of the mailbox database, and an event list that comprises events that represent requested changes to the mailbox database. The computer-readable data storage system also stores a crawl-indexing module that, when executed by the processing unit, causes the source server system to perform a first crawl-indexing process that updates the search index based on un-indexed message objects stored in a crawl-mode mailbox in the mailbox database. In addition, the computer-readable data storage system stores an event module that, when executed by the processing unit, causes the source server system to automatically perform a first event-indexing process that processes events stored in the event list, thereby updating the search index based on ones of the events that represent changes to an event-mode mailbox in the mailbox database. The computer-readable data storage medium also comprises a restoration module that, when executed by the processing unit, causes the source server system to listen for a restoration event. Furthermore, in response to receiving a restoration event, the restoration module causes the source server system to automatically suspend the first event-indexing process and the first crawl-indexing process. The restoration module also causes the source server system to after the first event-indexing process and the first crawl-indexing process have been suspended. In addition, the restoration module causes the source server system to automatically send, from the source server system to the target server system, a first set of data that the target server system uses to generate a copy of the search index. Furthermore, after the first event-indexing process and the first crawl-indexing process have been suspended, the restoration module causes the source server system to automatically send from the source server system to the target server system a watermark that indicates an event in the event list that the first event-indexing process has most-recently processed. In addition, the restoration module causes the source server system to automatically resume performance of the first event-indexing process and the first crawl-indexing process after the source server system has sent the first set of data and the watermark to the target server system. The restoration module causes the source server system to automatically instruct the target server system to begin performing a second event-indexing process that processes events in a copy of the event list at the target server system, thereby updating the copy of the search index based on ones of the events stored in the copy of the event list that represent changes to message objects stored in an event-mode mailbox in a copy of the mailbox database at the target server system, starting with an event in the copy of the event list that follows the watermark. In addition, the restoration module causes the source server system to automatically instruct the target server system to begin performing a second crawl-indexing process that updates the copy of the search index based on un-indexed message objects stored in a crawl-mode mailbox in the copy of the mailbox database.

In another example, the technologies of this disclosure may be realized as a computer-readable data storage medium comprising instructions that, when executed by a processing unit of a source server system in a high-availability server system, cause the source server system to automatically perform a first crawl-indexing process that updates a search index of a mailbox database based on un-indexed message objects stored in a crawl-mode mailbox in the mailbox database. The instructions also cause the source server system to automatically perform a first event-indexing process that processes events in an event list, thereby updating the search index based on ones of the events stored in the event list that represent changes to an event-mode mailbox in the mailbox database. Furthermore, the instructions cause the source server system to automatically suspend, in response to a restoration event, the first event-indexing process and the first crawl-indexing process. In addition, the instructions cause the source server system to send from the source server system to a target server system in the high-availability server system, after the first event-indexing process and the first crawl-indexing process have been suspended, a first set of data that the target server system uses to generate a copy of the mailbox database. The instructions also cause the source server system to send from the source server system to the target server system, after the event-indexing process and the crawl-indexing process have been suspended, a second set of data that the target server system uses to generate a copy of the search index. Furthermore, the instructions cause the source server system to send from the source server system to the target server system, after the event-indexing process and the crawl-indexing process have been suspended, a third set of data that the target server system uses to generate a copy of the event list. In addition, the instructions cause the source server system to send from the source server system to the target server system, after the event-indexing process and the crawl-indexing process have been suspended, a watermark that indicates a most recent event in the event list that the first event-indexing process has processed. Furthermore, the instructions cause the source server system to resume, after sending the first set of data, the second set of data, the third set of data, and the watermark, the first event-indexing process and the first crawl-indexing process. In addition, the instructions cause the source server system to instruct, after sending the first set of data, the second set of data, the third set of data, and the watermark, the target server system to begin performing a second event-indexing process that processes events in the copy of the event list, thereby updating the copy of the search index based on ones of the events in the copy of the event list that represent changes to message objects stored in an event-mode mailbox in the copy of the mailbox database, starting with an event in the copy of the event list that follows the watermark. Furthermore, the instructions cause the source server system to instruct, after sending the first set of data, the second set of data, the third set of data, and the watermark, the target server system to begin performing a second crawl-indexing process that updates the copy of the search index based on un-indexed message objects stored in a crawl-mode mailbox in the copy of the mailbox database. The instructions also cause the source server system to automatically poll an active server system in the high-availability server system for new message events. Furthermore, the instructions cause the source server system to upon receiving a new message event from the active server system, automatically apply a change represented by the new message event to the mailbox database. In addition, the instructions cause the source server system to automatically add the new message event to the event list.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for restoring a search index of a mailbox database, the method comprising:
   automatically performing a first event-indexing process, at a source server system in a high-availability server system, the first event-indexing process updating a search index of a mailbox database based on events stored in an event list by processing the events in the event list, at least some of the events representing changes to an event-mode mailbox in the mailbox database;
   determining, at the source server system, whether a watermark indicates all events in the event list have been processed;
       when the watermark does not indicate that all events in the event list have been processed, automatically advancing, at the source server system, the watermark such that the watermark indicates an event in the event list that sequentially follows the event previously indicated by the watermark; and
       after advancing the watermark, automatically processing, at the source server system, the event indicated by the watermark, thereby updating the search index based on the event indicated by the watermark when the event indicated by the watermark is applicable to the event-mode mailbox;
   in response to a restoration event, automatically suspending, at the source server system, the first event-indexing process;
   after suspending the first event-indexing process, automatically sending, from the source server system to a target server system in the high-availability server system, a first set of data that the target server system uses to generate a copy of the search index at the target server system;
   after suspending the first event-indexing process, automatically sending the watermark from the source server system to the target server system, the watermark indicating a mailbox event in the event list that the first event-indexing process has most recently processed;
   after sending the first set of data and the watermark, automatically resuming, at the source server system, the first event-indexing process and the first crawl-indexing process; and
   after sending the first set of data and the watermark, automatically instructing, at the source server system, the target server system to begin performing a second event-indexing process that processes events stored in a copy of the event list at the target server system, thereby updating the copy of the search index based on ones of the events stored in the copy of the event list that represent changes to an event-mode mailbox in a copy of the mailbox database at the target server system, starting with an event in the copy of the event list that follows the watermark.

2. The method of claim 1, further comprising:
   automatically performing, at a source server system in a high-availability server system, a first crawl-indexing process that updates the search index based on un-indexed message objects stored in a crawl-mode mailbox in the mailbox database;
   in response to the restoration event, automatically suspending, at the source server system, the first crawl-indexing process; and
   after sending the first set of data and the watermark, automatically resuming, at the source server system, the first crawl-indexing process.

3. The method of claim 2, further comprising after sending the first set of data and the watermark, automatically instructing, at the source server system, the target server system to begin performing a second crawl-indexing process that updates the copy of the search index based on un-indexed message objects stored in a crawl-mode mailbox in the copy of the mailbox database.

4. The method of claim 2, wherein performing the first crawl-indexing process comprises:
   automatically selecting, at the source server system, an un-indexed message object in the crawl-mode mailbox; and
   automatically updating, at the source server system, the search index to make the selected message object searchable using the search index.

5. The method of claim 4, wherein performing the first crawl-indexing process further comprises:
   automatically determining, at the source server system, whether all message objects in the selected mailbox are indexed; and
   when it is determined that all message objects in the selected mailbox are indexed, automatically changing, at the source server system, an indexing mode of the selected mailbox to event-mode indexing.

6. The method of claim 1, further comprising:
   receiving, at the source server system, a request to perform a change to the mailbox database; and
   in response to the request to change the mailbox database, automatically generating, at the source server system, an event in the event list that represents the change to the mailbox database.

7. The method of claim 6, wherein the change to the mailbox database is a receipt, by the source server system, of an email message.

8. The method of claim 1, further comprising after suspending the first event-indexing process, automatically sending, from the source server system to the target server system, a second set of data that the target server system uses to generate the copy of the mailbox database.

9. The method of claim 1, further comprising after suspending the first event-indexing process, automatically sending, from the source server system to the target server system, a third set of data that the target server system uses to generate the copy of the event list.

10. The method of claim 1, wherein the source server system is an active server system of the high-availability messaging system and the target server system is a standby server system of the high-availability messaging system.

11. The method of claim 1, further comprising receiving the restoration event when the target server system comes back online after a data storage system of the target server system has entered an error state.

12. The method of claim 1, wherein the search index comprises search index entries, each of which specifies a reference string and a set of identifiers of message objects in the mailbox database that specify the reference string.

13. The method of claim 1, further comprising:
automatically polling, at the source server system, an active server system in the high-availability server system for new message events;
upon receiving a new message event from the active server system, automatically applying, at the source server system, a change represented by the new message event to the mailbox database; and
automatically adding, at the source server system, the new message event to the event list.

14. A high-availability server system, comprising:
a target server system that provides a service that enables clients of the high-availability server system to access message objects when the target server system is an active server system of the high-availability server system and when the target server system stores a synchronized copy of a mailbox database and a synchronized copy of a search index; and
a source server system that enables clients of the high-availability server system to access message objects when the source server system is an active server system of the high-availability server system, the source server system comprising:
a processing unit; and
a computer-readable data storage system that stores:
a mailbox database comprising message objects;
a search index of the mailbox database; and
an event list that comprises events that represent requested changes to the mailbox database;
a crawl-indexing module that, when executed by the processing unit, causes the source server system to perform a first crawl-indexing process that updates the search index based on un-indexed message objects stored in a crawl-mode mailbox in the mailbox database;
an event module that, when executed by the processing unit, causes the source server system to:
automatically perform a first event-indexing process that updates the search index based on events that represent changes to an event-mode mailbox in the mailbox database;
automatically determine whether a watermark indicates all events in the event list have been processed;
when the watermark does not indicate that all events in the event list have been processed, automatically advance the watermark such that the watermark indicates an event in the event list that sequentially follows the event previously indicated by the watermark; and
after advancing the watermark, automatically process the event indicated by the watermark, thereby updating the search index based on the event indicated by the watermark to the search index when the event indicated by the watermark is applicable to the event-mode mailbox;

a restoration module that, when executed by the processing unit, causes the source server system to:
listen for a restoration event;
in response to receiving a restoration event, automatically suspend the first event-indexing process and the first crawl-indexing process;
after the first event-indexing process and the first crawl-indexing process have been suspended, automatically send, from the source server system to the target server system, a first set of data that the target server system uses to generate a copy of the search index;
after the first event-indexing process and the first crawl-indexing process have been suspended, automatically send the watermark from the source server system to the target server system, the watermark indicating an event in the event list that the first event-indexing process has most-recently processed;
automatically resume performance of the first event-indexing process and the first crawl-indexing process after the source server system has sent the first set of data and the watermark to the target server system;
automatically instruct the target server system to begin performing a second event-indexing process that processes events in a copy of the event list at the target server system, thereby updating the copy of the search index based on ones of the events stored in the copy of the event list that represent changes to message objects stored in an event-mode mailbox in a copy of the mailbox database at the target server system, starting with an event in the copy of the event list that follows the watermark; and
automatically instruct the target server system to begin performing a second crawl-indexing process that updates the copy of the search index based on un-indexed message objects stored in a crawl-mode mailbox in the copy of the mailbox database.

15. The high-availability server system of claim 14, wherein the source server system is a single electronic computing device and the target server system is a single electronic computing device.

16. The high-availability server system of claim 14, wherein the restoration module further causes the source server system to:
after the first event-indexing process and the first crawl-indexing process have been suspended, automatically send, from the source server system to the target server system, a second set of data that the target server system uses to generate the copy of the mailbox database; and
after the first event-indexing process and the first crawl-indexing process have been suspended, automatically send, from the source server system to the target server system, a third set of data that the target server system uses to generate the copy of the event list.

17. The high-availability server system of claim 14, wherein the indexing module causes the source server system to perform the first crawl-indexing process at least in part by causing the processing unit to:
automatically select an un-indexed message object in the crawl-mode mailbox; and
automatically update the search index to make the selected message object searchable using the search index.

18. A computer-readable data storage medium comprising instructions that, when executed by a processing unit of a source server system in a high-availability server system, cause the source server system to:

automatically perform a first crawl-indexing process that updates a search index of a mailbox database based on un-indexed message objects stored in a crawl-mode mailbox in the mailbox database;

automatically perform a first event-indexing process updating the search index based on events stored in an event list processing the events in the event list, at least some of the events representing changes to an event-mode mailbox in the mailbox database;

determine, at the source server system, whether a watermark indicates all events in the event list have been processed;

when the watermark does not indicate that all events in the event list have been processed, automatically advance, at the source server system, the watermark such that the watermark indicates an event in the event list that sequentially follows the event previously indicated by the watermark; and after advancing the watermark, automatically process, at the source server system, the event indicated by the watermark, thereby updating the search index based on the event indicated by the watermark when the event indicated by the watermark is applicable to the event-mode mailbox;

automatically suspend, in response to a restoration event, the first event-indexing process and the first crawl-indexing process;

send from the source server system to a target server system in the high-availability server system, after the first event-indexing process and the first crawl-indexing process have been suspended, a first set of data that the target server system uses to generate a copy of the mailbox database;

send from the source server system to the target server system, after the event-indexing process and the crawl-indexing process have been suspended, a second set of data that the target server system uses to generate a copy of the search index;

send from the source server system to the target server system, after the event-indexing process and the crawl-indexing process have been suspended, a third set of data that the target server system uses to generate a copy of the event list;

send the watermark from the source server system to the target server system, after the event-indexing process and the crawl-indexing process have been suspended, the watermark indicating a most recent event in the event list that the first event-indexing process has processed;

resume, after sending the first set of data, the second set of data, the third set of data, and the watermark, the first event-indexing process and the first crawl-indexing process;

instruct, after sending the first set of data, the second set of data, the third set of data, and the watermark, the target server system to begin performing a second event-indexing process that processes events in the copy of the event list, thereby updating the copy of the search index based on ones of the events in the copy of the event list that represent changes to message objects stored in an event-mode mailbox in the copy of the mailbox database, starting with an event in the copy of the event list that follows the watermark;

instruct, after sending the first set of data, the second set of data, the third set of data, and the watermark, the target server system to begin performing a second crawl-indexing process that updates the copy of the search index based on un-indexed message objects stored in a crawl-mode mailbox in the copy of the mailbox database;

automatically poll an active server system in the high-availability server system for new message events;

upon receiving a new message event from the active server system, automatically apply a change represented by the new message event to the mailbox database; and automatically add the new message event to the event list.

\* \* \* \* \*